UNITED STATES PATENT OFFICE 2,124,896

DRIED DRUPACEOUS FRUIT TREATMENT

Henri Daniel Rey, Papeete, Tahiti, assignor to The Anglo California National Bank of San Francisco, trustee, San Francisco, Calif., a corporation No Drawing. Application September 12, 1936, Serial No. 100,560

10 Claims. (Cl. 99—104)

This invention relates to dried fruits and has for its object an improved method of treating or processing drupaceous fruits, particularly dried prunes, whereby the whole fruit bodies are rendered very soft and pliable and the pits are loosened within the bodies or substantially freed from attachment to the flesh, so that they may be very easily removed when eating the fruit or when using the fruit in the preparation of various dishes.

Other objects and advantages of the method will appear in the following description.

The invention relates to the process or method of treating dried fruits described in my copending application for patent filed simultaneously herewith under Serial No. 100,559, entitled "Dried fruit processing", it being a specific adaptation and variation thereof for drupaceous fruits.

The invention is based on my discovery that if an ordinary dried prune of commerce (generally containing from about 17% to 22% of moisture) is flattened under pressure, as by passing it through a pair of pressure rolls so spaced as to not mash the pit, and the resulting flat disk-like prune of about $\frac{3}{16}$th of an inch in thickness is dropped into boiling water for from about 2 to 6 minutes it will absorb water within its innermost interstices from the pit outward and very largely regain its plum-like shape, and, moreover, the pit will be found to have been loosened from the flesh to such an extent that by pressure applied to the sides of the fruit near one end, the pit may be forced through the flesh and out of the body.

The pressure rolls may be metal or hard wood, or other firm material, and preferably of a slight roughened surface, and geared together and arranged so as to drag the fruit bodies through in a single layer. The spacing of the rolls should be adjusted until it is just a trifle greater than the thickness of the flattened pits (if prunes or plums are being treated), and as the fruit bodies enter between the rolls in a single layer they will automatically turn and adjust themselves, if necessary, to bring their pits flatwise between the pressure rolls. As the fruit bodies pass through the rolls their flesh is flattened and stretched laterally from their pits in all directions so as to loosen it therefrom, yet without breaking the skin which is very tough and rubbery and still (generally with some flesh) covers both flat sides of the pits after the fruit bodies emerge from the rolls in flat disklike condition, even though most of the flesh has been forced away by the rolls.

I have also tried preheating the drupaceous fruit bodies by subjecting them to a substantially dry heat of from about 200 to about 500° F. for from about 6 to about 2 minutes time, or until the heat has penetrated through the bodies, before flattening them between the rollers, and it is found beneficial in some cases, especially if a very dry, hard, refractory, poor grade of dried prunes is being treated, and in which case the preferred heat range is from about 350 to about 450 degrees F.

After the flattening process, and if preheated, preferably before the flattened fruit bodies have cooled, they are given the scalding water treatment, preferably carried on at boiling temperature for from about 2 to about 5 minutes more or less until the fruit bodies have absorbed enough of the water to bring their total moisture content up to about 25% by weight. The fruit bodies by this time will be very soft and pliable and will largely have regained their rotundity, and may be removed from the boiling water, drained of the surplus water and at once packed while hot. It has been found that the substantially dry preheating of the fruit bodies as set out, greatly aids in the thorough permeation of the hot water, and this advantage may be secured by such a substantially dry heat treatment after the flattening roller treatment.

Drupaceous fruits treated as above described will be found to be of a very superior texture, soft and tender, with pits freed within, and since they were flattened to disk form before the boiling water treatment their sterilization will be found most complete and their keeping qualities excellent.

The entire process may be carried out within ten minutes of time from commercial dried prune to tenderized packed product at extremely low cost.

If desired, the boiling water treatment may be in two stages or more, entered progressively so as to finish in cleanest water, or the fruit may travel on a conveyor through the boiling water counter-current for the same purpose.

Having thus described my improved method of processing drupaceous fruits, what I claim is:

1. The process of treating dried prunes which comprises flattening the dried prune bodies to substantially disk-like form with the flat sides of their pits lying in the plane of the disk to thereby stretch the flesh in direction generally away from the pits and loosen the flesh from the pits within the bodies.

2. The process of treating dried prunes which comprises flattening the dried prune bodies to substantially disk-like form with the flat sides of their pits lying in the plane of the disk by passing the fruit bodies between pressure rolls to thereby stretch the flesh in direction generally away from the pits and loosen the flesh from the pits within the bodies.

3. The process of treating dried drupaceous fruits which comprises flattening the fruit bodies to substantially disk-like form to thereby stretch the flesh in direction generally away from the pits and loosen the flesh from the pits, thereafter soaking the flattened bodies in scalding water until they have partially regained their original form.

4. The process of treating dried prunes which comprises flattening the dried prune bodies to substantially disk-like form with the flat sides of their pits lying in the plane of the disk to thereby stretch the flesh in direction away from the pits and loosen the flesh from the pits, thereafter soaking the flattened prunes in scalding water until they have partially regained their original form.

5. The process of treating dried prunes which comprises flattening the dried prune bodies to substantially disk-like form with the flat sides of their pits lying in the plane of the disk to thereby stretch the flesh in direction generally away from the pits and loosen the flesh from the pits, thereafter soaking the flattened prunes in boiling water for a time period ranging from about 2 to about 5 minutes until the total moisture content of the prunes is about 25% by weight.

6. The process of treating dried drupaceous fruits which comprises subjecting the fruit bodies to a substantially dry heat ranging from about 200° to 500° F. until the heat has penetrated through the bodies, flattening the bodies by pressure into disk form, and thereafter soaking the flattened bodies in hot water until their form is partially restored.

7. The process of treating dried drupaceous fruits which comprises subjecting the fruit bodies to a substantially dry heat ranging from about 200° to 500° F. until the heat has penetrated through the bodies, flattening the bodies by pressure into disk form, and thereafter soaking the flattened bodies in boiling water until they absorb water to bring their total water content up to about 25% by weight.

8. The process of treating dried drupaceous fruits which comprises flattening the fruit bodies to form disks, thereafter subjecting the flattened bodies to a heat of from 200° to 500° F. and thereafter to scalding water until the bodies have partially regained their form.

9. The process of treating dried drupaceous fruits which comprises subjecting the fruit bodies to a substantially dry heat ranging from about 200° to 500° F. until the heat has penetrated through the bodies, flattening the hot bodies by pressure into disk form, and thereafter soaking the hot flattened bodies in hot water until their form is partially restored.

10. The process of treating dried drupaceous fruits which comprises subjecting the fruit bodies to a substantially dry heat ranging from about 200° to 500° F. until the heat has penetrated through the bodies, flattening the hot bodies by pressure into disk form, and thereafter soaking the hot flattened bodies in boiling water until they absorb water to bring their total water content up to about 25% by weight.

HENRI DANIEL REY.